United States Patent [19]

Becker

[11] Patent Number: 5,301,715
[45] Date of Patent: Apr. 12, 1994

[54] SANITARY FITTING WITH A PIVOTING FLOW ARM

[75] Inventor: Albert Becker, Wittlich, Fed. Rep. of Germany

[73] Assignee: American Standard Inc., New York, N.Y.

[21] Appl. No.: 952,873

[22] PCT Filed: May 8, 1991

[86] PCT No.: PCT/EP91/00869
§ 371 Date: Nov. 25, 1992
§ 102(e) Date: Nov. 25, 1992

[87] PCT Pub. No.: WO91/19125
PCT Pub. Date: Dec. 12, 1991

[30] Foreign Application Priority Data

May 30, 1990 [DE] Fed. Rep. of Germany ....... 4017328

[51] Int. Cl.$^5$ .............................................. E03C 1/02
[52] U.S. Cl. .................................... 137/615; 137/359; 137/801
[58] Field of Search ...................... 137/615, 801, 359; 4/676, 677

[56] References Cited

U.S. PATENT DOCUMENTS 4,457,342  7/1984  Moen ............................. 137/615 X
4,821,764  4/1989  Brenez ........................... 137/801 X

FOREIGN PATENT DOCUMENTS 0221245  5/1987  European Pat. Off. .
3531935  3/1987  Fed. Rep. of Germany .

OTHER PUBLICATIONS

Friedrich Grohe, Eurodisc 33 891, Aug. 1987.

Primary Examiner—Martin P. Schwadron
Assistant Examiner—Kevin L. Lee
Attorney, Agent, or Firm—Elaine Brenner Robinson; Ann M. Knab

[57] ABSTRACT

In a sanitary fitting with a cylindrical fitting body that can be mounted in a fixed position and has inlet and outlet channels and an outflow channel, with a cylindrical fitting sleeve that has a pivot arm with an outlet mouthpiece connected at the side and is pushed onto the body of the fitting, with a valve unit mounted on the body of the fitting and with a cap that covers the valve unit and is connected to the fitting sleeve, whereby sealing rings are provided between the fitting body and the fitting sleeve in the area of the outflow channel and in addition a lower bearing ring and an upper bearing ring are also provided, and whereby the bearing rings are preferably made of a plastic, especially a low-friction, low-wear plastic, and the lower bearing ring has an L-shaped cross section with a cylindrical section that forms a radial bearing and a projecting flange-like section that forms an axial bearing, and the upper bearing ring also has a cylindrical section that forms a radial bearing, the design of the bearing rings is further improved by designing the lower bearing ring and the upper bearing ring so they are both continuous in the cylindrical section.

13 Claims, 3 Drawing Sheets

SANITARY FITTING WITH A PIVOTING FLOW ARM

This invention concerns a sanitary fitting with a cylindrical body that can be mounted in a fixed position, with inlet and outlet channels and an outflow channel, with a cylindrical fitting sleeve pushed onto the fitting body and a pivot arm connected at the side with an outlet mouthpiece, with valve unit mounted on the fitting body and a cap connected to the fitting sleeve and covering the valve unit, where sealing rings are arranged between the fitting body and the fitting sleeve in the area of the outflow channel on the one hand and on the other hand there is an upper bearing ring and a lower bearing ring, where the bearing rings are preferably made of plastic, especially a low-friction, low-wear plastic, and the lower bearing ring is designed as an L-shaped cross section with a cylindrical section that forms a radial bearing and a protruding flange-like section that forms an axial bearing, and the upper bearing ring also has a cylindrical section that forms a radial bearing.

Sanitary fittings of this type are used especially in kitchens, especially in the form of single-lever single-hole kitchen batteries. With the known sanitary fitting on which this invention is based (see the installation and operating instructions for the "Eurodisc 33 891" sanitary fitting of Friedrich Grohe Armaturenfabrik GmbH +Co., 8/87), the cap is bolted to the valve unit. Moreover, there are two peripheral lip sealing rings above and below the peripheral outflow channel in the fitting sleeve between the fitting sleeve and the fitting body screwed in the sink. The valve unit in the form of a compact cartridge is mounted in a fixed position on the fitting body by means of mounting bolts. It is bolted to the body of the fitting with the help of two mounting bolts. The upper bearing ring is between the compact cartridge and the fitting body and is clamped between the cartridge and the fitting body with a flange that projects radially outward on the one hand and on the other hand together with the cylindrical section it serves as a radial bearing for the fitting sleeve. The lower bearing ring with the L-shaped cross section rests on a lower ring flange of the fitting body with its flange-like section and projects from there with its cylindrical section between the fitting body and the fitting sleeve so this forms both an axial bearing and a radial bearing for the fitting sleeve. The cylindrical section here is provided with a number of relatively wide radial slits, so the cylindrical section is formed by a number of individual elastic tongues, so to speak. Thus, the lower bearing ring can be put under tension in the fitting sleeve. The lower bearing ring is secured by the continuous circumferential flange-like section.

This invention is based on the problem of improving the design of the known sanitary fitting explained above.

The problem described above is solved by the fact that the lower bearing ring is designed so it is continuous in the cylindrical section and projects upward above the fitting sleeve with a projecting section which has radial catch projections for locking the cap in position. With the sanitary fitting according to this invention, the upper bearing ring not only has the function of providing radial bearing support for the fitting sleeve on the fitting body but instead the upper bearing ring also serves to secure the cap, which need not be screwed on as in the state of the art but now can be simply locked in position.

There are various possibilities of embodying and refining the teaching according to the present invention. To do so, reference is first made to the patent claims that are subordinate to Patent claim 1. Moreover, this invention in its various possible embodiments will now be explained in further detail in conjunction with the discussion of a preferred embodiment of this invention with reference to the figures which show the following.

Figure 1:
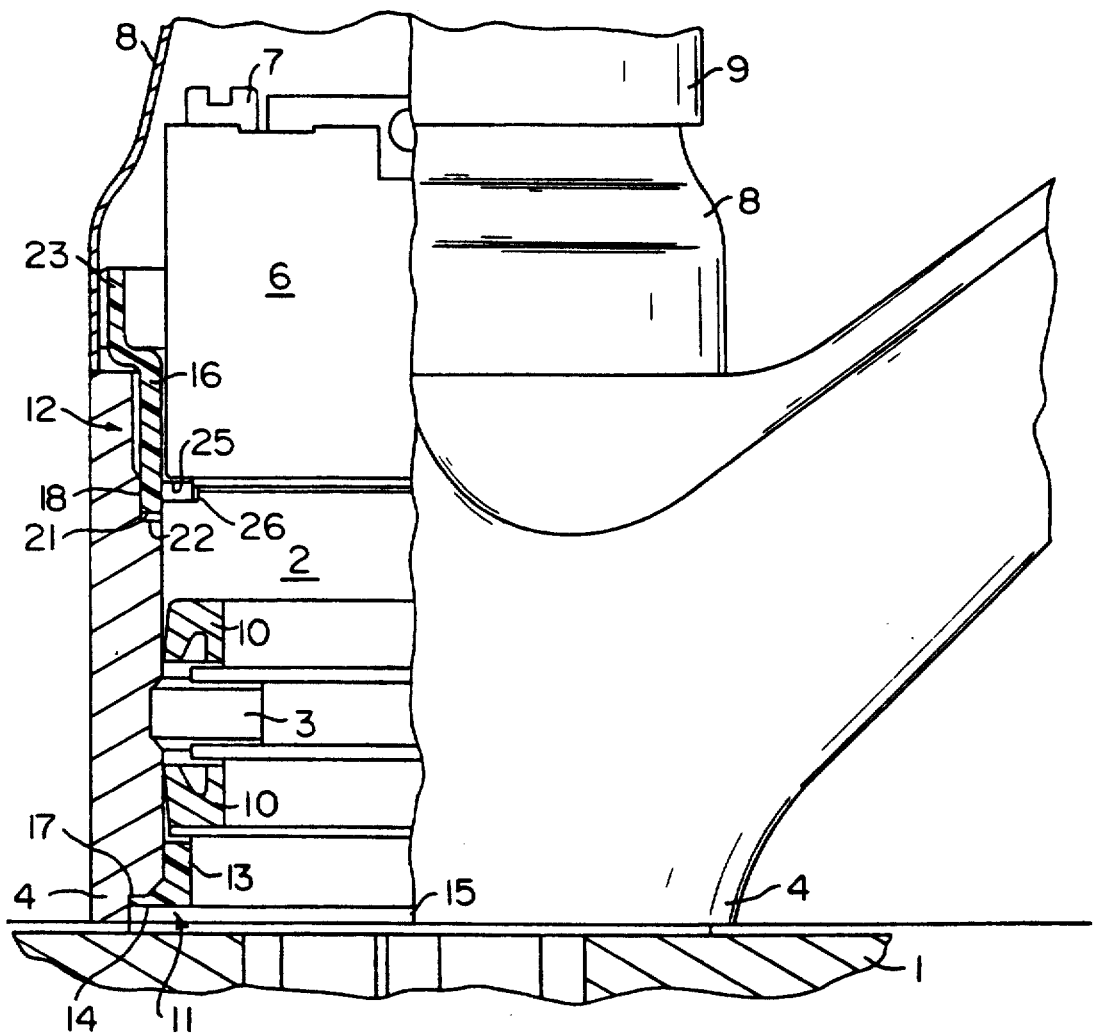
FIG. 1 shows a side view with a partial cutaway of a preferred embodiment of a sanitary fitting according to this invention.

FIG. 1 shows a sanitary fitting (at the left in the sectional view, at the right in the projected view) such as those used especially in the form of a single-lever, single-hole kitchen battery. This sanitary fitting is mounted on a sink bed plate 1 as indicated here. A cylindrical fitting body 2 of the sanitary fitting having inlet and outlet channels (not shown) as usual as well as a recessed outflow channel 3 is mounted in a fixed position. A cylindrical sleeve 4 with pivot arm 5 connected at the side is pushed onto fitting body 2. Pivot arm 5 has an outlet mouthpiece (not shown here). Fitting sleeve 4 can be rotated with respect to fitting body 2 about the joint longitudinal axis so the pivot arm 5 can be pivoted from one side to the other.

As explained above, the sanitary fitting shown here is a single-level, single-hole kitchen battery with a compact cartridge as valve unit 6. Valve unit 6 is mounted on fitting body 2 with the help of mounting bolts 7 that run longitudinally through valve unit 6 in threaded boreholes in fitting body 2. FIG. 1 shows one of these mounting bolts 7. Valve unit 6 is covered by cap 8 that is connected to fitting sleeve 4 and is in turn covered by an anchor mounting plate 9 that is moved together with an operating lever (not shown).

In the area of outflow channel 3, there are two sealing rings 10 between fitting body 2 and fitting sleeve 4. In addition, there is a lower bearing ring 11 and an upper bearing ring 12 between fitting body 2 and fitting sleeve 4. Bearing rings 11 and 12 in the embodiment shown here as well as in the state of the art are made of an especially low-friction, low-wear plastic. Lower bearing ring 11 has an L-shaped cross section and a cylindrical section 13 that forms a radial bearing and a projecting flange-like section 14 that forms an axial bearing. This figure also shows base ring 15 which may be a separate part but may also be designed as a circumferential outside flange on stationary fitting body 2. Base ring 15 at any rate supports section 14 of the lower bearing ring 11 that forms the axial bearing. The upper bearing ring 12 also has a cylindrical section 16 that forms a radial bearing. It is designed so it is continuous in the cylindrical section 16. Fitting sleeve 4 is provided with peripheral recesses 17, 18 that fit bearing rings 11, 12.

Figure 5:
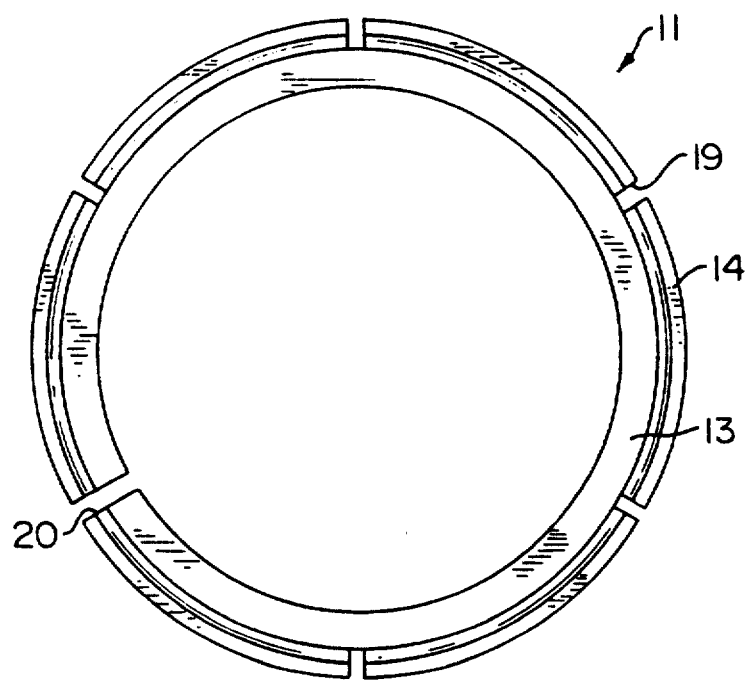
FIG. 5 shows a top view of the lower bearing ring from FIG. 4.

One can also see in FIG. 5 that the lower bearing ring 11 has several radial slits 19 distributed on the circumference of the projecting flange-like section 14. Slits 19 prevent warping of the flange-like section 14 so it can be without stress and serve as an axial bearing for fitting sleeve 4 and is exposed to very little wear. For technical assembly reasons, lower bearing ring 11 is also provided with a single continuous radial installation slit 20 here so that lower bearing ring 11 can be simply inserted into recess 17.

Figure 2:
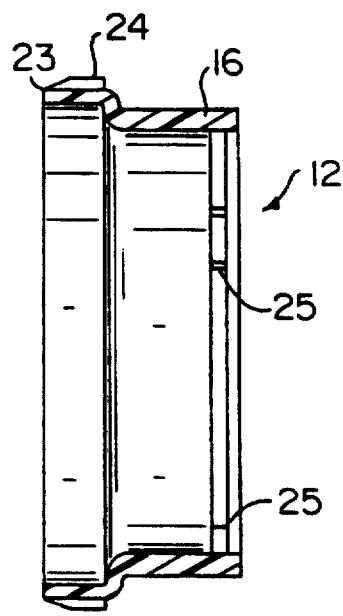
FIG. 2 shows a cross section through an upper bearing ring of a sanitary fitting according to FIG. 1.
Figure 3:
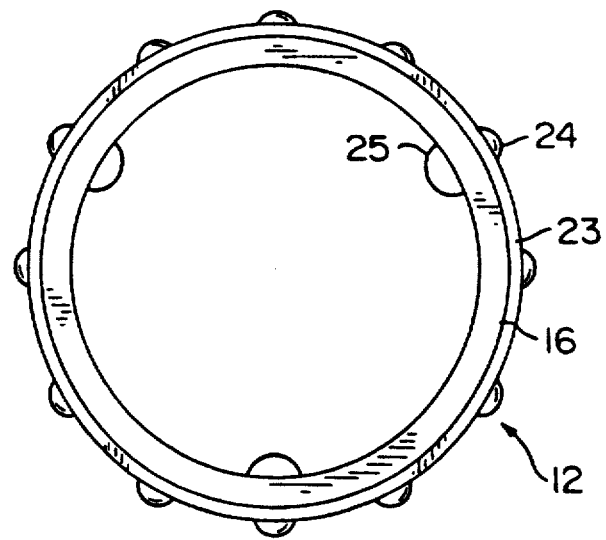
FIG. 3 shows a top view of the upper bearing ring from FIG. 2.
Figure 4:
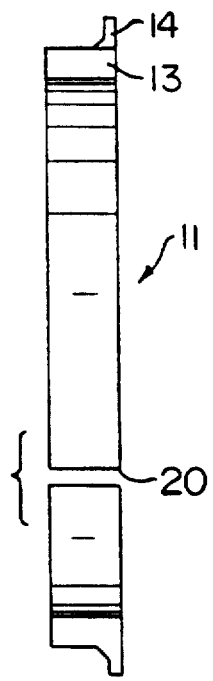
FIG. 4 shows a cross section through a lower bearing ring for a sanitary fitting according to FIG. 1

FIGS. 1, 2 and 3 show a few particulars with regard to upper bearing ring 12.

It is essential first that the upper bearing ring 12 with face edge 21 of cylindrical section 16 is opposite ring face 22 on fitting sleeve 4 with some tolerance. This tolerance shows clearly that there is no axial guidance for the fitting sleeve due to the upper baring ring 12 so that bearing ring 12 is not restrained as in the state of the art. This also greatly reduces the wear on bearing ring 12.

It may be noticed that the upper bearing ring 12 does not have a flange-like projecting section that serves as the axial bearing. In other words, the upper bearing ring 12 is used not only for radial bearing of fitting sleeve 4 on fitting body 2 but also for another function. FIGS. 1 and 2 show that upper bearing ring 12 projects with projecting section 23 upward above fitting sleeve 14 and has radial projections 24 in the projecting section 23 for locking cap 8 in position. In the state of the art, cap 8 was screwed onto valve unit 6 and the latter was provided with an outside thread for this purpose. However, the connection made possible by means of catch projections 24 and corresponding catch recesses in cap 8 is much simpler and less expensive. Upper bearing ring 12 offers a simple design option according to this invention for mounting the required catch projections 24. The opposite arrangement of catch projections 24 and catch recesses would of course also be possible.

FIG. 1 shows that the outside face of sanitary fitting is smooth and continuous and is formed by the outside faces of fitting sleeve 4 and cap 8. Upper bearing ring 12 is additionally secured and cap 8 is positioned in an improved manner when upper bearing ring 12 has a radial projecting flange on the lower end of projecting section 23, so it projects between fitting sleeve 4 and cap 8 and its outside edge is flush with the outside surfaces of fitting sleeve 4 and cap 8. However, this is not shown in the figure.

So far there has not been any discussion of how the upper bearing ring 12 is secured in the sanitary fitting shown here. In the state of the art, recesses in the circumferential cylindrical section with mounting bolts passing through them serve this purpose. Since the cylindrical section 16 of bearing ring 12 is designed so it is continuous here, however, a different solution has been found. FIGS. 1 and 3 here show especially clearly that cylindrical section 16 of upper bearing ring 12 surrounds valve unit 6 and has tabs 25 projecting inward on the inside circumference and recesses 26 that fit tabs 25 are provided in fitting body 2 Bearing ring 12 is secured so it cannot twist with respect to fitting body 2 by means of tabs 25 that engage in recesses 26 (three tabs 25 are provided here). Thus, it cannot turn with fitting sleeve 4. At the same time, bearing ring 12 is secured in the axial direction and the catch projections 24 are in their prescribed positions so that cap 8 can be locked accurately in position. In the embodiment shown in FIG. 1, cap 8 also secures fitting sleeve 4 in an elastic manner in the axial direction.

From a technical assembly standpoint, it is expedient that recesses 26 are arranged on the top side of fitting body 2 facing valve unit 6 and tabs 25 are secured in recesses 26 by the valve unit 6 positioned on it and connected to fitting body 2. The opposite arrangement would also be possible from a design standpoint but would be less advantageous in assembly.

An alternative not shown in the figure using mounting bolts 7 would consist of having tabs with continuous boreholes for mounting bolts 7 arranged at the positions provided for mounting bolts 7.

On the whole, the sanitary fitting according to this invention is an improved design of a largely wear resistant sanitary fitting with a pivoting flow arm.

Summary

In a sanitary fitting with a cylindrical fitting body that can be mounted in a fixed position and has inlet and outlet channels and an outflow channel, with a cylindrical fitting sleeve that has a pivot arm with an outlet mouthpiece connected at the side and is pushed onto the body of the fitting, with a valve unit mounted on the body of the fitting and with a cap that covers the valve unit and is connected to the fitting sleeve, whereby sealing rings are provided between the fitting body and the fitting sleeve in the area of the outflow channel and in addition a lower bearing ring and an upper bearing ring are also provided, and whereby the bearing rings are preferably made of a plastic, especially a low-friction, low-wear plastic, and the lower bearing ring has an L-shaped cross section with a cylindrical section that forms a radial bearing and a projecting flange-like section that forms an axial bearing, and the upper bearing ring also has a cylindrical section that forms a radial bearing, the design of the bearing rings is further improved by designing the lower bearing ring and the upper bearing ring so they are both continuous in the cylindrical section.

I claim:

1. A sanitary fitting comprising:
   a cylindrical fitting body securable in a fixed position;
   inlet and outlet channels;
   an outflow channel;
   a cylindrical fitting sleeve having a pivot arm connected at the side, said pivot arm having an outlet mouthpiece, said fitting sleeve fitted on said fitting body;
   a valve unit mounted on said fitting body;
   a cap connected to said fitting sleeve and covering said valve unit;
   a set of sealing rings provided in the area of said outflow channel and between said fitting body and said fitting sleeve; and
   a lower bearing ring and an upper bearing ring provided between said fitting body and said fitting sleeve, said lower bearing ring having an L-shaped cross section including a cylindrical section forming a radial bearing and a projecting flange-like section forming an axial bearing, said upper bearing ring having a second cylindrical section forming a second radial bearing, said second cylindrical section of said upper bearing ring being continuous, said upper bearing ring having a second projecting section projecting upward above said fitting sleeve, said second projecting section having radial projections for locking said cap into position.

2. The sanitary fitting as claimed in claim 1, wherein said lower bearing ring and said upper bearing ring are made of plastic.

3. The sanitary fitting as claimed in claim 2, wherein said plastic is a low friction, lower wear plastic.

4. The sanitary fitting as claimed in claim 3, wherein said cylindrical section of said lower bearing ring is continuous.

5. The sanitary fitting as claimed in claim 4, wherein said lower bearing ring has a plurality of radial slits distributed around the circumference of said projecting flange-like section.

6. The sanitary fitting as claimed in claim 5, wherein said lower bearing ring has a radial installation slit running through said cylindrical section and through said projecting flange-like section.

7. The sanitary fitting as claimed in claim 6, wherein said cylindrical section of said upper bearing ring is disposed opposite to said fitting sleeve with some tolerance.

8. The sanitary fitting as claimed in claim 7, wherein said second projecting section has a larger outside diameter than said second cylindrical section.

9. The sanitary fitting as claimed in claim 8, wherein the wall thickness of said second projecting section is less than the wall thickness of said second cylindrical section.

10. The sanitary fitting as claimed in claim 9, wherein said upper bearing ring has a flange projecting readily outward on said lower end of said second projecting section, said flange projecting into the inner space between said fitting sleeve and said cap and its outside edge being flush with said outside fitting sleeve and said cap.

11. The sanitary fitting as claimed in claim 10, wherein said second cylindrical section of said upper bearing ring surrounds said valve unit, said second cylindrical section comprising tabs projecting inward on its interior, said fitting body having recesses that fit said tabs.

12. The sanitary fitting as claimed in claim 11, wherein said recesses are arranged on the top side of said fitting body facing said valve unit and said tabs of said second cylindrical section are secured in said recesses by said valve unit placed thereon and connected to said fitted body.

13. The sanitary fitting as claimed in claim 12, whereby said valve unit is bolted to said fitting body.

* * * * *